(No Model.)

J. PALMER.
POTATO DIGGING MACHINE.

No. 559,864. Patented May 12, 1896.

Witnesses.
J. Friedlander
T. Schlanser

Inventor.
James Palmer ived by me is simple in construction and will be very effective in digging potatoes.

UNITED STATES PATENT OFFICE.

JAMES PALMER, OF MOORHEAD, MINNESOTA.

POTATO-DIGGING MACHINE.

SPECIFICATION forming part of Letters Patent No. 559,864, dated May 12, 1896.

Application filed October 12, 1893. Serial No. 488,002. (No model.)

*To all whom it may concern:*

Be it known that I, JAMES PALMER, a citizen of the United States, residing at Moorhead, in the county of Clay and State of Minnesota, have invented a new and useful Potato-Digging Machine, of which the following is a description.

My invention relates to improvements in machines for digging potatoes; and its novelty and advantages will be fully understood from the following description and claim, when taken in connection with the accompanying drawings, in which—

Figure 1:
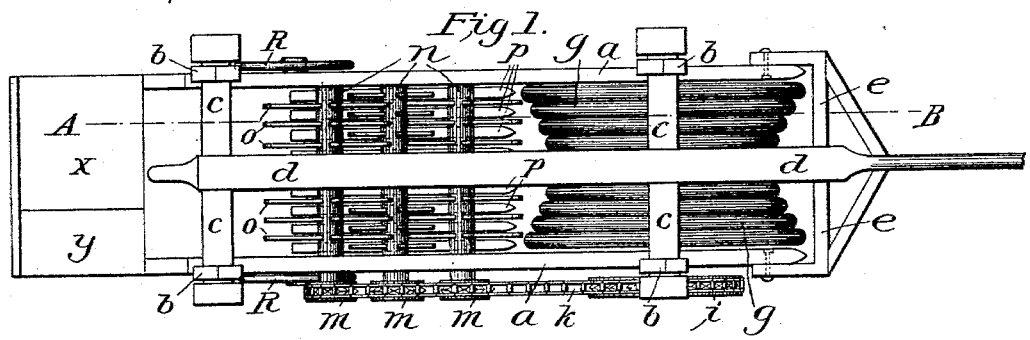
Figure 2:
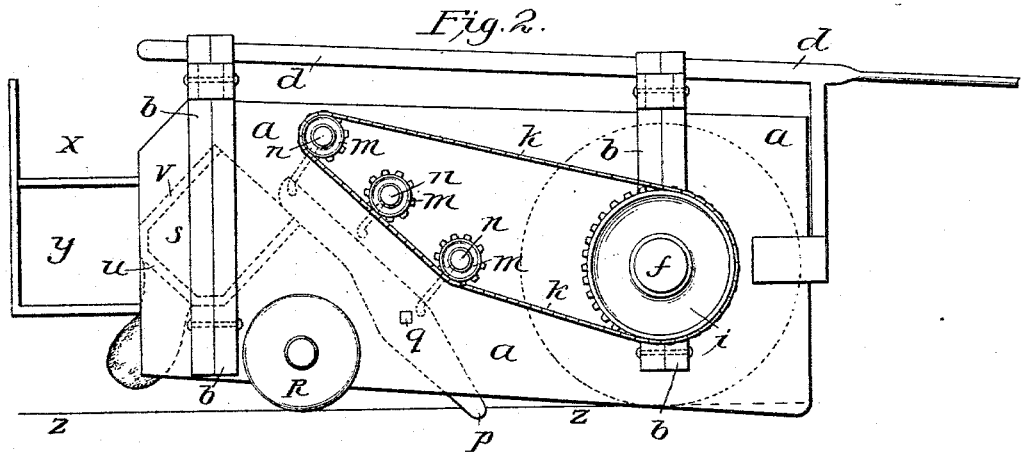
Figure 4:
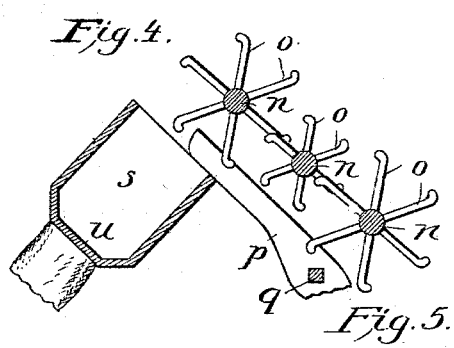
Figure 3:
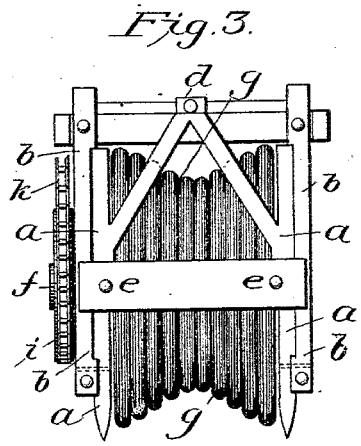
Figure 5:
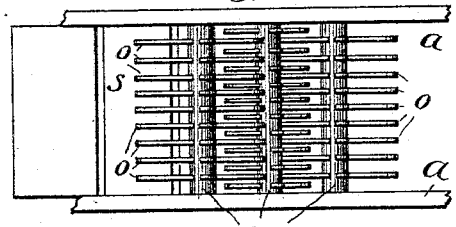

Figure 1 is a plan view of my improved machine. Fig. 2 is a side elevation of the same. Fig. 3 is a front elevation. Fig. 4 is a detail longitudinal section taken in the plane indicated by the line A B of Fig. 1, and Fig. 5 is a detail plan view of the parts shown in Fig. 4.

Referring by letter to said drawings, Z indicates a line representing the surface of the earth, and $a$ indicates the vertical side plates of my improved machine. These plates $a$, as shown in Figs. 2 and 3 of the drawings, have the lower portions of their forward edges sharpened, and they are adapted to cut through the earth at about the depth shown in Fig. 2, so as to prevent the following digging-teeth from scattering the raised earth at the side of the path of the digger. The said plates $a$, which are arranged about the proportional distance illustrated apart, are connected at their forward ends by the transverse bar $e$, to which the draft-animal may be and preferably is hitched, and are provided on their outsides adjacent to their forward and rear ends with uprights $b$, as better shown in Fig. 2. These uprights $b$ have their upper ends connected by cross-bars $c$, and to these cross-bars is connected the longitudinal bar $d$, which is designed to afford a convenient hand-grasp when the operator or operators desire to lift the machine to one side or turn the same.

$f$ indicates a transverse shaft which is journaled in the side plates $a$ and forward uprights $b$.

$g$ indicates a fluted or corrugated roller which is fixed on shaft $f$ and is increased in diameter from its middle to its ends, so as to enable it to break the clods of dirt and permit a separation of the potatoes from the same.

$i$ indicates a sprocket-wheel which is fixed on one end of the shaft $f$, and $p$ indicates the inclined potato-digging teeth. These teeth $p$, which are arranged about one inch apart between the plates $a$, are fixed on a transverse bar $q$ in rear of the roller $g$ and extend below the plane of the lower edge of the plates $a$, so as to enable them to take up the potatoes from the earth loosened by the roller $g$ and separate the same from the earth which falls back into the path of the machine.

Journaled in the plates $a$, above the teeth $p$, are transverse shafts $n$, which have sprocket-wheels $m$ at their ends connected by a belt $k$ with the wheel $i$ on the shaft $f$, whereby it will be seen that when the roller $g$ is rotated by being drawn over the ground said shafts $n$ will also be rotated. The upper and lower shafts $n$ are provided at intervals throughout their length with potato-elevating fingers $o$, which move between the teeth $p$, while the intermediate shaft $o$ is provided with similar fingers, but of a less length, which are arranged between the fingers of the upper and lower shafts and consequently in the same planes as the teeth $p$. These potato-elevators engage the potatoes as they come upon the teeth $p$ and raise them to the upper end of the teeth, where they are discharged into the receptacle $s$. This receptacle $s$ is preferably made of such a size that it contains one bushel, and it is provided with a slidable or other bottom which is adapted to be opened, so that it may be conveniently discharged of its contents by the operator when desired. The slidable bottom is preferable as it admits of the attachment of a bag, into which the potatoes may be discharged when desired.

R indicates wheels upon which the rear portion of the machine is supported, and $x$ indicates the driver's seat, which is suitably connected to rear ends of the side plates $a$ and has a step $y$ beneath it, by which the driver may readily get into his seat.

In the practical operation of my improved machine it will be seen that the side plates $a$ will cut the earth so as to prevent it and the potatoes from scattering at the side of the path of the machine when raised, and will also prevent any of the potatoes from falling laterally off the teeth $p$ and will insure the delivery of the potatoes into the receptacle $s$. The forward roller $g$ will crush the earth, so as to permit of a ready separation of the potatoes from the earth and weeds by the teeth $p$ following the roller, and the elevators will raise the potatoes on the teeth $p$ and discharge the same into the receptacle $s$. When desired, the receptacle $s$ may be provided with a spout, so that the operator may, by opening the bottom of the receptacle, dump the potatoes in piles at intervals in the length of the path of the machine.

It will be appreciated from the foregoing that while my improved machine is very efficient, yet it is cheap, simple, and durable and embodies no parts which are likely to get out of order after a short period of use.

Having described my invention, what I claim is—

The potato-digging machine described consisting of the side plates $a$, having the lower portions of their forward edges sharpened so as to enable them to cut the earth, the uprights $b$, connected to said side plates and rising therefrom, the transverse bars $c$, connecting said uprights, the longitudinally-disposed bar arranged on and connected to the transverse bars $c$, the corrugated earth-crushing roller increased in diameter from its middle to its ends and fixed on a transverse shaft $f$, and arranged between the side plates, the sprocket-wheel $i$, fixed on the end of said shaft $f$, the fixed inclined teeth arranged at intervals between the side plates in rear of the roller and depending below the lower edges of said side plates, transverse shafts $n$, journaled in the side plates above the inclined teeth and having sprocket-wheels at their ends, a sprocket-chain connecting said wheels and the sprocket-wheel $i$, fingers fixed on the shafts $n$, between the side plates and adapted to raise potatoes on the inclined teeth, a receptacle arranged at the upper ends of the inclined teeth and having a bottom adapted to be opened, a driver's seat arranged at the rear end of the machine, and wheels R, supporting the rear portion of the machine, substantially as specified.

JAMES PALMER.

Witnesses:
J. FRIEDLANDER,
R. A. WENZIN.